US007457649B1

(12) United States Patent
Wilson

(10) Patent No.: US 7,457,649 B1
(45) Date of Patent: Nov. 25, 2008

(54) HEADSET CHARGING STATION

(75) Inventor: Jay Wilson, Portola Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 464 days.

(21) Appl. No.: 11/218,190

(22) Filed: Aug. 31, 2005

(51) Int. Cl.
*H04M 1/00* (2006.01)
*H04Q 7/20* (2006.01)

(52) U.S. Cl. ................. 455/575.2; 455/569.2; 455/572; 379/428.02; 381/374

(58) Field of Classification Search .............. 455/575.2, 455/572, 573, 569.1, 569.2; 381/370, 374; 379/428.02, 428.08; 320/114, 115
See application file for complete search history.

(56) References Cited

U.S. PATENT DOCUMENTS 6,923,688 B1 * 8/2005 Burson et al. ............... 439/675

FOREIGN PATENT DOCUMENTS

EP 1548911 * 6/2005

* cited by examiner

*Primary Examiner*—Lee Nguyen
(74) *Attorney, Agent, or Firm*—Intellectual Property Law Offices of Thomas C. Chuang

(57) ABSTRACT

Systems and methods for a charging station are disclosed. The system generally includes a housing with pockets for receiving a wireless headset and providing charging power from the charging station to the wireless headset. The charging station allows for easy docking and allows the headset to occupy a minimum footprint.

24 Claims, 8 Drawing Sheets

HEADSET CHARGING STATION

BACKGROUND OF THE INVENTION

Wireless headsets and other portable communications devices are often battery powered such that a user can use the wireless headset or other such device without being directly connected to larger power source such as an A/C outlet or automobile battery. This allows wireless headset users flexibility and convenience to move about without being tied to a power cord. Wireless headset batteries are generally rechargeable so that the batteries can be re-used instead of being discarded after use.

Typically, the wireless headset includes an electrical interface such as a mating connector to transfer charging current to the headset battery so that charging current power can be supplied to recharge the batteries without removing the batteries from the device. Recharging is generally performed in one of two ways: (1) a low-voltage cable connector from a wall transformer is plugged directly into the headset's mating connector, or (2) the headset is placed in a charging station. Charging stations may also be referred to as docking stations or charging bases. In a typical setup, the portable device is inserted into a charging station which has contacts that correspond to and couple with the contacts on the portable device.

The charging station is connected to a power source, and supplies charging current through the coupled contacts to recharge the batteries located within the device. Once inserted, the charging station begins to charge the headset battery. The charging station also performs the dual function of providing a place to store the headset that is open and convenient.

Most folding headsets are compact when folded but somewhat difficult to handle and place into a charging station. In the prior art, charging stations for folding headsets have had difficult or inconvenient systems for mating the headset charging interface (also referred to herein as an electrical interface) with the charging station charging interface. For example, if the headset's charging connector is on the bottom of the speaker puck, it is difficult to dock because the docking is "blind" i.e., the user cannot see the connector interface.

As a result, there is a need for improved methods and apparatuses for wireless headset charging stations and associated headset interfaces.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for charging stations for wireless mobile communication devices are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Generally, this description describes a method and apparatus for a charging station for a wireless mobile communication device such as a headset which does not require "blind" docking, minimizes the charging station footprint and overall size, and presents the docked headset in an elegant and stable manner. The present invention is applicable to a variety of different types of mobile communication devices in addition to headsets. While the present invention is not necessarily limited to headsets, various aspects of the invention may be appreciated through a discussion of various examples using this context.

According to an example embodiment of the present invention, a wireless folding headset includes a yoke stem on each side of the headset. When the headset is folded and oriented in an upright manner, the yoke stems point downward as vertical sticks. By placing the charging connector in one of the stems and vertically docking the stems into a thin horizontal base, the procedure becomes easy and visually elegant, allowing the headset to occupy a minimum footprint and making it easy to remove.

Figure 1:
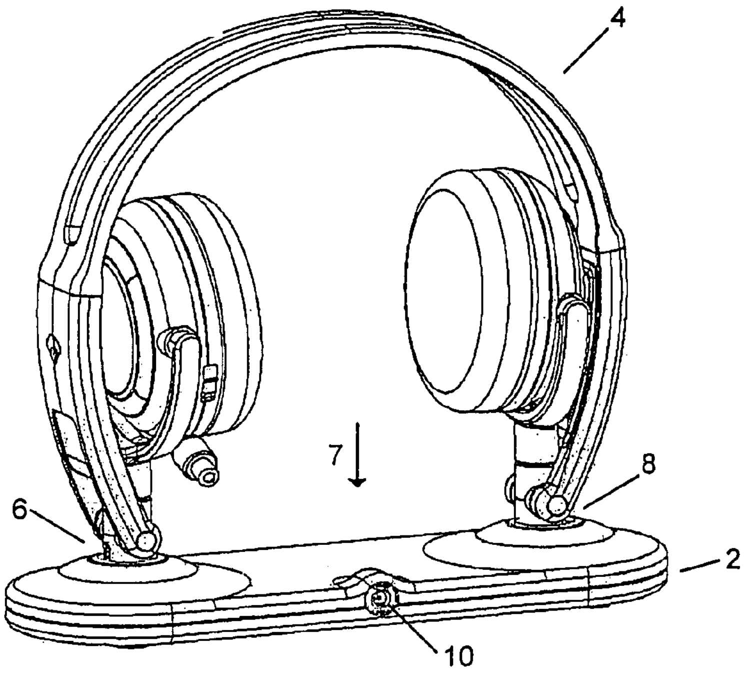
FIG. 1 illustrates a perspective view of a charging station with a wireless headset inserted therein in one example of the invention.

Referring to FIG. 1, a perspective view of a charging station with a wireless headset inserted therein in one example of the invention is illustrated. A headset 4 is shown docked in a charging station 2. The charging station 2 generally includes a pocket 6 and a pocket 8. Headset 4 is described in further detail below in reference to FIG. 4 and FIG. 5. Charging station 2 further generally includes a power supply connector 10. Power supply connector 10 provides connection to a cord that is connected to a main AC power supply of the type used with a common wall outlet. In a further example, the cord may be connected to a DC power source such as a car battery. In one example of the invention, power supply connector 10 is the same as headset electrical interface 26 described below in reference to FIG. 6 and FIG. 7, allowing the use of standardized modular components.

Figure 2:
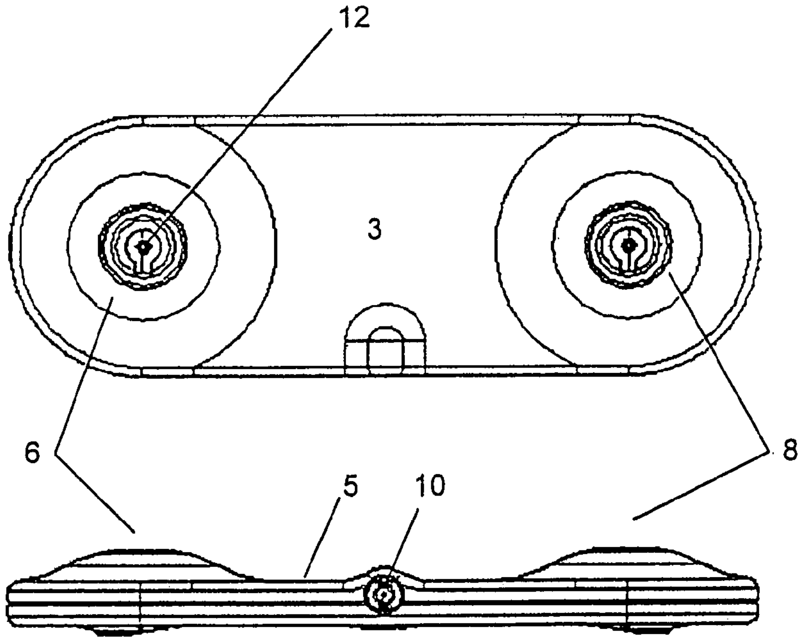
FIG. 2 illustrates a schematic side view and a top view of the charging station shown in FIG. 1.

FIG. 2 illustrates a schematic side view and a top view of the charging station 2 shown in FIG. 1. The charging station 2 includes a main body which is substantially planar and horizontally oriented with a top surface, main body underside portion, and a charging contact device. For example, the charging contact device may be electrical interface 12 which functions as described below. The main body is preferably made of lightweight plastic, but may consist of any suitably rigid material. The main body underside portion provides support and a non-scratching material for the base of the charging station.

Pocket 6 and pocket 8 in the top surface 3 of charging station 2 guide and align the inserted headset. Pocket 6 and pocket 8 are shaped to substantially match the shape of the inserted headset component, and are aligned with the electrical interface 12 such that when headset yokes are inserted into pocket 6 and pocket 8, the headset contact interface is properly mated with the contacts of electrical interface 12. In one example of the invention, the pocket 6 and pocket 8 have a circular cross-section. In an example of the invention, the openings of pocket 6 and 8 are elevated above a lower surface 5 of the top of charging station as shown in FIG. 2, allowing for convenient insertion and retention of the headset.

Referring to FIG. 2, an electrical interface 12 is located at the bottom of the pocket 6 to provide electrical contact between a headset battery and a source of charging current fed to electrical interface 12 via power supply connector 10. The headset battery may be any rechargeable battery, such as a lithium ion battery for example. When a headset is inserted into pocket 6 and pocket 8, a headset electrical interface mates with the electrical interface 12. It is through the mated electrical interfaces that charging power is supplied to the headset.

Charging station 2 further includes a printed circuit board (PCB) (not shown). The power received from power supply connector 10 is transferred to the PCB, which may include various electrical components and circuits for controlling the charging of the headset battery. For example, the PCB may include voltage regulators, current regulators, microprocessors and transistors to form a charging circuit responsible for starting, ramping, tapering, and ending charging voltage and current. Additionally, the charging circuit may monitor battery parameters such as voltage, capacity, and temperature. The PCB electrical circuit is coupled to power supply connector 10 and electrical interface 12 by wire or other form of electrical connector. An AC/DC power converter converts the external AC power supply to a standard DC voltage which is usable by the charging base for charging the headset battery. The charging station may also have external indicators for identifying the charging status of the headset battery. Although a charging station 2 for use with a portable headset device is illustrated, the charging station 2 may be utilized with any battery powered communication device that requires battery power during portable operation.

Charging station 2 enables easy insertion of the headset into the charging station and easy coupling of the headset charging contacts to the charging station charging contacts without the need for visual mating of the charging station contacts and headset contacts. In particular, charging station 2 allows the headset to be inserted into the charging station 2 such that the headset is properly guided to its proper location to achieve a locked position detent between the headset and charging station 2, enabling secure contact between the contacts of the headset and the corresponding contacts of the charging base when the headset is inserted into the charging station pockets.

Figure 3:
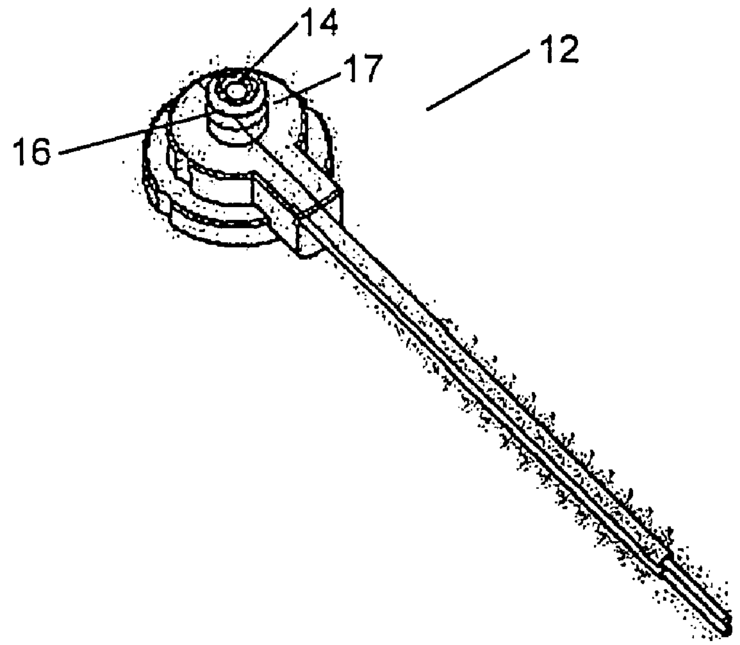
FIG. 3 illustrates a perspective view of an electrical interface used by the charging station in one example of the invention.

Referring to FIG. 3, a perspective view of an electrical interface 12 used by the charging station 2 in one example of the invention is illustrated. The charging station electrical interface 12 has a cylindrical male plug 17 with interior positive contact 14 and exterior negative contact 16. Interior positive contact 14 includes a female connector. In one example, interior positive contact 14 has a female connector constructed to receive and mate with a positive contact 102 of a headset electrical interface 26 as described below. Exterior negative contact 16 has a flanged outer surface constructed to couple with a negative contact 104 of electrical interface 26 as described below.

Figure 4:
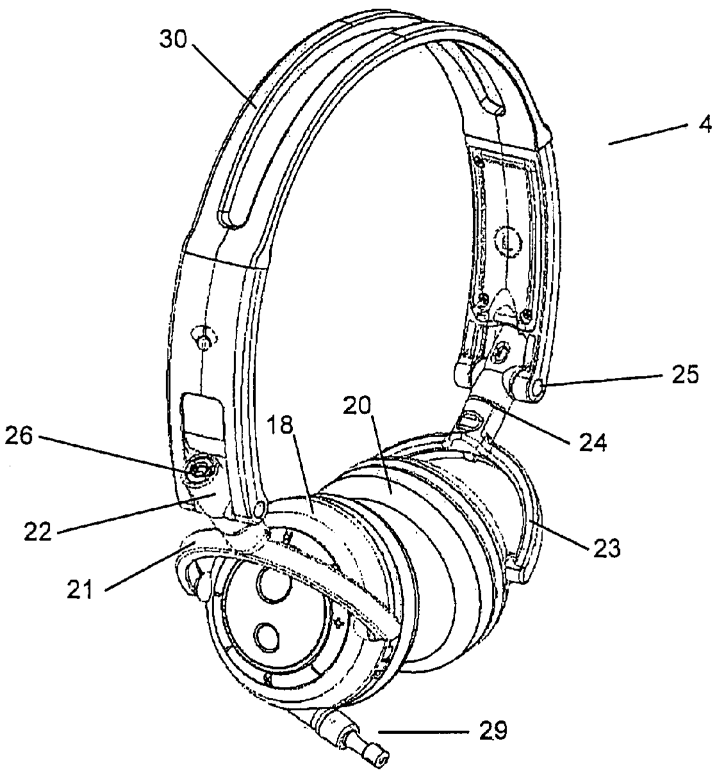
FIG. 4 illustrates a perspective view of the wireless headset shown in FIG. 1.
Figure 5:
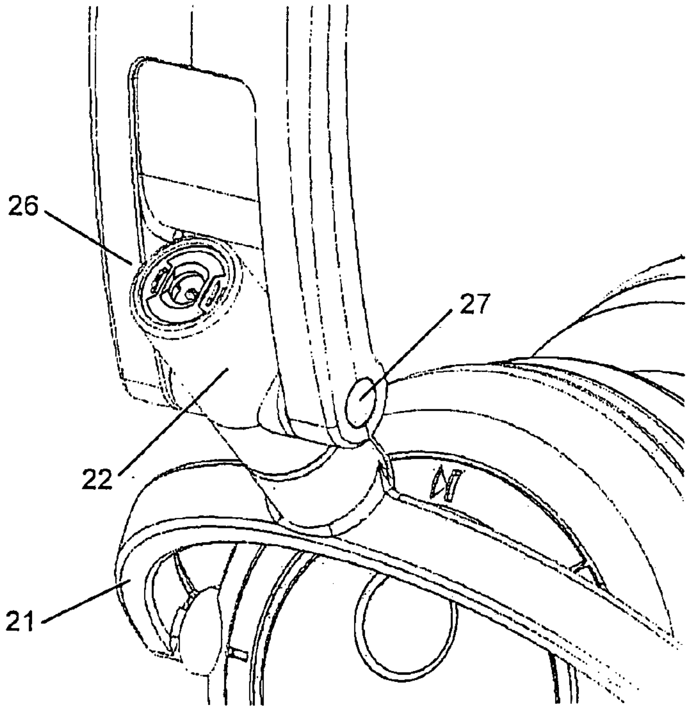
FIG. 5 illustrates a close-up view of a wireless headset electrical interface disposed in a headset yoke in one example of the invention.

FIG. 4 illustrates a perspective view of the wireless headset 4 shown in FIG. 1. The wireless headset 4 includes a headband 30, speaker 18, speaker 20, and a wireless communication module installed within the housing of the headset. The term "module" is used interchangeably with "circuitry" herein. In an example of the invention, speaker 18 and speaker 20 are flexibly coupled to headband 30 using a yoke 21 and yoke 23, respectively. Referring to FIG. 5, yoke 21 includes a yoke stem 22 coupled to headband 30 via a pivot pin 27. In a similar manner, referring to FIG. 4, yoke 23 includes a yoke stem 24 coupled to headband 4 via a pivot pin 25. An electrical interface 26 is disposed within yoke stem 22.

The headset 4 may further include a user interface and status indicator. The user interface may include a multifunction power, volume, mute, and select button or buttons. Other user interfaces may be included on the headset, such as a link active/end interface. It will be appreciated that numerous other configurations exist for the user interface. The particular button or buttons and their locations are not critical to the present invention. The wireless headset 4 includes a boom interface 29 for coupling a boom module with a microphone installed at the lower end of the boom. The wireless headset 4 further includes a rechargeable battery for providing power to the various components of the headset.

Wireless headset 4 may include a headset controller that comprises a processor, memory and software to implement headset functionality. The headset controller receives input from the headset user interface and manages audio data received from the microphone and sent to speaker 18 and speaker 20. The headset controller further interacts with a wireless communication module to transmit signals from wireless headset 4 and receive wireless signals.

Figure 6:
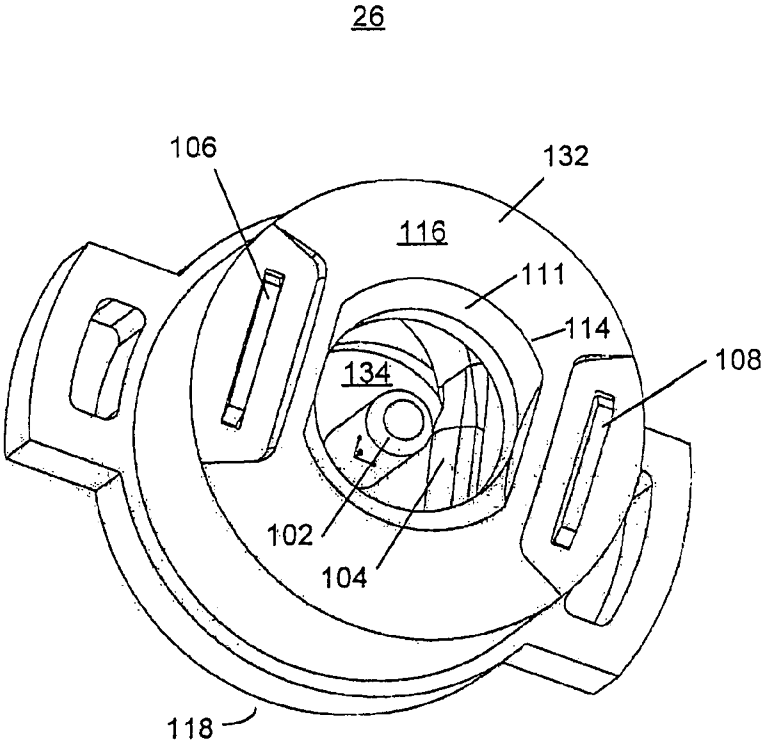
FIG. 6 illustrates a close-up view of the wireless headset electrical interface shown FIG. 5.
Figure 7:
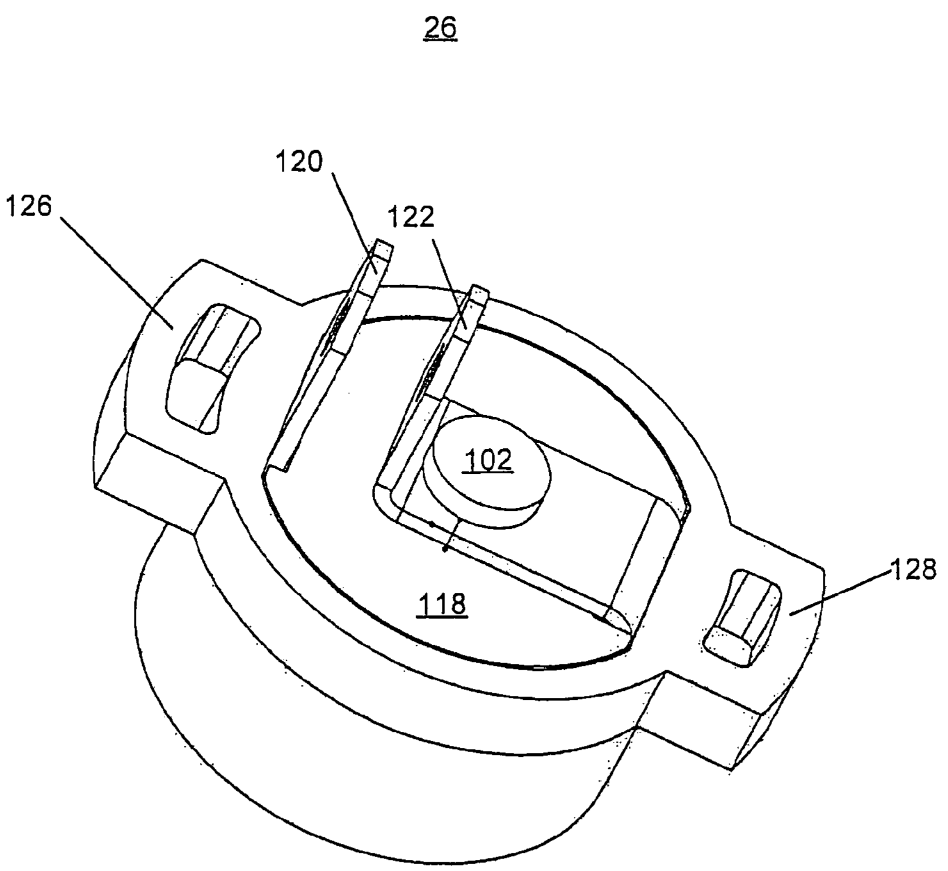
FIG. 7 illustrates a rear view of the wireless headset electrical interface shown in FIG. 6.

Referring to FIG. 6 and FIG. 7, a close-up perspective view of a wireless headset electrical interface 26 (also referred to as a "dual system charging interface module") disposed in a headset yoke in one example of the invention is illustrated. Referring to FIG. 6, a front view illustration of an embodiment of the headset electrical interface 26 is shown. The headset electrical interface 26 is shown removed from a headset. In use, the front surface of the dual charging interface is aligned with the base surface of the headset yoke.

The headset electrical interface 26 comprises an outer housing 132 having a front surface 116 and a back surface 118. Outer housing 132 is made of a molded polymer, although any suitable material may be used. Front surface 116 contains an aperture 114 opening to a well 134 located within outer housing 132 for accepting a male plug. Front surface 116 further contains a semi-spherical recessed area 111. Two surface charging contacts, negative contact arc 106 and positive contact arc 108 are disposed on front surface 116. The headset electrical interface 26 further comprises a negative contact 104 and a positive contact 102 disposed within well 134. Although referred to with different designations herein, in an embodiment of the invention, negative contact 104 and negative contact arc 106 are a single piece construction and electrically parallel. Similarly, positive contact 102 and positive contact 108 are a single piece construction and electrically parallel. The negative contact and the positive contact are made of a suitable electrically conductive material such as copper. Contacts designated positive herein can also be designated negative and vice versa.

The headset electrical interface 26 is mounted from inside the headset yoke and presents an approximately 6.5 mm diameter plastic face with slightly raised metal negative contact arc 106 and positive contact arc 108 arrayed around aperture 114. The module is mounted so that the face is as flush as possible to the base surface of the headset yoke. The contact arcs are proud of the surface by about 0.1 mm to 0.2 mm in an embodiment of the invention. In an embodiment of the invention, the contact arcs are concentric shaped. In a further embodiment of the invention, the contact arcs may be linear.

The headset electrical interface 26 includes two charging interfaces. The first charging interface comprises a negative contact 104 and positive contact 102 disposed within well 134 behind aperture 114. The second charging interface operates as a female connector for use with a cable having a male charging plug. In an embodiment of the invention, negative contact 104 is a spiral coil contact positioned within well 134 that engages the inserted cable having a male charging plug. Positive contact 102 is a pin structure disposed in the center of well 134 that inserts into a corresponding positive contact receptacle of the male charging plug. For example, positive contact 102 and negative contact 104 mate with the cylindrical male plug 17 of charging station electrical interface 12 shown and described above in reference to FIG. 3.

The second charging interface utilizes stationary charging contacts comprising negative contact arc 106 and positive contact arc 108 disposed on front surface 116. Negative contact arc 106 and positive contact arc 108 mate with corresponding contacts on a charging base when a headset is inserted into the charging base. The corresponding contacts on the charging base are typically spring loaded, and engage negative contact arc 106 and positive contact arc 108 when the headset is inserted into the charging base. Negative contact arc 106 is coupled to electrical ground. In an embodiment of the invention, the first charging interface further utilizes recessed area 111 and aperture 114 to secure contact between negative contact arc 106 and positive contact arc 108 with corresponding charging contacts on a charging base.

Referring to FIG. 7 showing the backside of headset electrical interface 26, the bottom surface of positive contact 102 is shown. Outer housing 132 includes a back surface 118. A negative terminal 120 and positive terminal 122 are utilized to provide charging current to a rechargeable battery located at the headset. In an embodiment of the invention, negative contact 104, negative contact arc 106, and negative terminal 120 are a single piece construction. Similarly, positive contact 102, positive contact arc 108, and positive terminal 122 are a single piece construction. The battery is a rechargeable battery, such as a lithium ion battery, which is electrically coupled to negative terminal 120 and positive terminal 122. The electrically parallel first charging interface and second charging interface provide an efficient and space saving arrangement to provide charging power to the rechargeable battery. In an alternate embodiment, although electrically coupled, negative contact 104, negative contact arc 106, and negative terminal 120 are not a single piece construction. Similarly, in an alternate embodiment, positive contact 102, positive contact arc 108, and positive terminal 122 are not a single piece construction. Positive contact 102 extends through positive terminal 122 and back surface 118 into well 134.

As a result, charging current is provided to a battery at the headset coupled to negative terminal 120 and positive terminal 122 regardless of which charging interface is utilized. Outer housing 132 further includes headset mounting handles 126 and 128 for mounting headset electrical interface 26 within a headset yoke or elsewhere. The headset electrical interface 26 may be manufactured as a stand-alone module, and has the packaging flexibility allowing for either board or cable mounting.

The electrical interface 26 provides at least two sets of charging contacts. Each set of charging contacts can be used independently from the other set to transfer charging current. When a headset using electrical interface 26 is coupled to a charging station, one of the sets of charging contacts electrically couple to contacts of the charger, and charging current is supplied from the charger to the battery at the headset to recharge the battery. Dual contact systems disposed on a single headset are beneficial in that they allow a user a choice of charging systems depending on the user's location. For example a cable adaptable for use with a cigarette lighter may be used in an automobile environment, while a charging base may be preferred at the user's office location.

Furthermore, the headset electrical interface 26 of the present invention is designed for use with common preexisting systems for providing charging power such as spring loaded contact mechanisms while also providing for use with charging power systems with advanced mechanisms to protect the headset surface during coupling of the headset and charger. Thus, a headset charging interface can be implemented in the headset that can accommodate different charger system configurations in a space saving, compact, mass produced and low cost headset. In summary, the headset electrical interface 26 described herein offers several advantages. The headset electrical interface 26 provides a solution that is small, adaptable to both stationary and mobile environments, and flexible in its mounting and orientation for optimal positioning on future headsets. Although they may be of a single piece construction, each set of charging contacts are intended to be used independently from each other, depending on user choice. By utilizing headset electrical interface 26 as a standardized interface, manufacturers can reduce the design time on future devices and make future headsets backwards compatible with previous chargers.

In operation, when the headset 4 is to be placed in charging station 2, the user positions speaker 18 and speaker 20 in an upright position as shown in FIG. 1 (as opposed to a down listening position shown in FIG. 4), resulting in headset yoke 22 and headset yoke 24 pointing in a downward direction. The downward pointing headset yoke 22 and headset yoke 24 are inserted into pocket 6 and pocket 8 in a downward direction 7 as shown in FIG. 1.

Upon insertion, the charging station cylindrical male plug 17 is inserted through the headset electrical interface aperture 114 into well 134. Positive contact 102 of headset electrical interface 26 fits into the female connector of charging station interior positive contact 14 to form an electrical interconnection. During insertion of male plug 17, negative contact 104 of headset electrical interface 26 extends in an outward radial direction due to force from the charging station male plug 17. Simultaneously, positive contact 102 enters interior positive contact 14.

Figure 8:
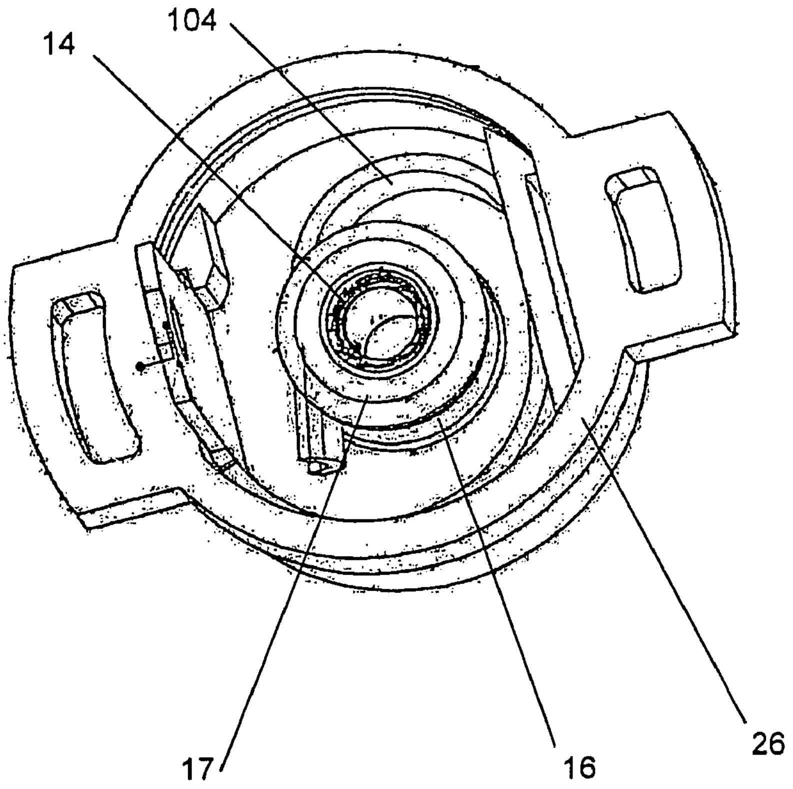
FIG. 8 illustrates mating of the wireless headset electrical interface with the charging station electrical interface.

As the insertion process of male plug 17 continues, the force on negative contact 104 by exterior negative contact 16 recedes as the flanged outer surface of negative contact 16 becomes parallel with negative contact 104, resulting in negative contact 104 retracting into a groove in the outer surface of negative contact 16 in a detent position. Simultaneously, positive contact 102 continues to be inserted into interior positive contact 14 until full insertion is reached, corresponding to the locked (also referred to herein as "detent") position of negative contact 16. The radial force applied by male plug 17 against negative contact 104 results in sideways movement of negative contact 104 until positive contact 14 engages positive contact 102 and maintains contact. Referring to FIG. 8, back surface 118 shown in FIG. 7 has been removed and negative contact 104 of headset electrical interface 26 is shown mated in a detent position with exterior negative contact 16 of male plug 17 after mating of headset electrical interface 26 with charging station electrical interface 12. For clarity, positive contact 102 is not illustrated in FIG. 8.

Pocket 6 and pocket 8 provide the necessary alignment to mate electrical interface 12 together with electrical interface 26 upon insertion of headset yoke 22 and yoke 24. In addition to providing electrical coupling, electrical interface 12 physically locks the headset within the charging station, allowing the headset to be displayed in a visually elegant manner without the possibility of the headset being tipped off the charging station.

The locked headset is therefore captured in pockets 6 and 8 and prevented from tipping over out of the charging station, providing a convenient, reliable, and elegant mechanism for storing and charging the headset. Electrical interface 12 and 26 are mated to provide charging power to the headset battery by forming a charging loop.

To remove the headset 4, it is lifted in an upward direction out of pocket 6 and pocket 8. As headset 4 is lifted, negative contact 104 of headset electrical interface 26 extends in an outward radial direction due to force from male plug 17, thereby allowing electrical interface 26 to be raised and uncoupled from charging station electrical interface 12. Simultaneously, positive contact 102 is withdrawn out from charging station interior positive contact 14. Once the headset electrical interface 26 and charging station electrical interface 12 are uncoupled, the headset 4 can then be freely withdrawn from charging station 2.

Although reference is made throughout the specification to a headset charging station and headset, the present invention could be employed in any device having contacts which couple with contacts of a removable device. Although reference is made throughout the specification to utilizing the contacts for charging, other purposes such as the transfer of data or any other purpose requiring coupling of devices. Furthermore, although in the preferred embodiment the charging station is used with a folding stereo headset, in other embodiments other types of headsets may be utilized.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: location of the headset electrical interface; structure of the charging station and headset electrical interfaces; number, placement, and functions performed by the headset and charging station user interface; wireless communication technologies or standards to perform the wireless communication. Furthermore, the shapes and sizes of the illustrated charging station and headset housing and components may be altered. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A charging station for a wireless headset comprising:
- a horizontally oriented housing;
- a first pocket for receiving a first wireless headset yoke;
- a second pocket for receiving a second wireless headset yoke;
- a charging station electrical interface disposed within the first pocket for mating with an associated wireless headset electrical interface disposed at the first wireless headset yoke, wherein the charging station electrical interface comprises a male plug with an interior contact and an exterior contact.

2. The charging station of claim 1, wherein the associated wireless headset electrical interface comprises:
- a first contact interface system for receiving a male connector, the first contact interface system comprising a housing with a front surface, wherein the front surface includes an aperture leading to a well within the housing, and wherein a first positive contact comprising a spring coil is disposed within the well and a first negative contact comprising a pin structure is disposed within the well; and
- a second contact interface system comprising conductive contacts disposed on the front surface outside the aperture, wherein the conductive contacts comprise a second positive contact and a second negative contact, wherein the aperture receives a charging member to detent the second positive contact and the second negative contact with corresponding contacts on a charger, and wherein the first positive contact is coupled to the second positive contact and the first negative contact is coupled to the second negative contact.

3. The charging station of claim 1, wherein the interior contact comprises a female connector for receiving a male connector and the exterior contact comprises a flanged ring for mating with a spring coil.

4. The charging station of claim 1, further comprising a power supply interface comprising:
- a contact interface system for receiving a male connector, the contact interface system comprising a housing with a front surface, wherein the front surface includes an aperture leading to a well within the housing, and wherein a first positive contact comprising a spring coil is disposed within the well and a first negative contact comprising a pin structure is disposed within the well.

5. The charging station of claim 1, wherein the first pocket and the second pocket have a circular cross-section.

6. The charging station of claim 1, wherein a first pocket opening and a second pocket opening are elevated above a lower surface of the horizontally oriented housing.

7. The charging station of claim 1, further comprising a charging circuit for controlling the transfer of charging power.

8. A charging station system for a folding wireless headset comprising:
- a charging station comprising:
  - a horizontally oriented housing;
  - a first pocket;
  - a second pocket; and
  - a charging station electrical interface disposed within the first pocket for mating with an associated wireless headset electrical interface, wherein the charging station electrical interface comprises a male plug with an interior contact and an exterior contact; and a folding wireless headset comprising:

a headband;

a speaker;

a yoke coupling the speaker and the headband, wherein the yoke has a first position for headset use and a second position for insertion into the first pocket of the charging station, and a wireless headset interface disposed within the yoke for coupling to the charging station electrical interface.

9. The charging station of claim 8, wherein the wireless headset interface disposed within the yoke comprises:

a first contact interface system for receiving a male connector, the first contact interface system comprising a housing with a front surface, wherein the front surface includes an aperture leading to a well within the housing, and wherein a first positive contact comprising a spring coil is disposed within the well and a first negative contact comprising a pin structure is disposed within the well; and a second contact interface system comprising conductive contacts disposed on the front surface outside the aperture, wherein the conductive contacts comprise a second positive contact and a second negative contact, wherein the aperture receives a charging member to detent the second positive contact and the second negative contact with corresponding contacts on a charger, and wherein the first positive contact is coupled to the second positive contact and the first negative contact is coupled to the second negative contact.

10. The charging station of claim 8, wherein the interior contact comprises a female connector for receiving a male connector and the exterior contact comprises a flanged ring for mating with a spring coil.

11. The charging station of claim 8, further comprising a power supply interface comprising:

a contact interface system for receiving a male connector, the contact interface system comprising a housing with a front surface, wherein the front surface includes an aperture leading to a well within the housing, and wherein a first positive contact comprising a spring coil is disposed within the well and a first negative contact comprising a pin structure is disposed within the well.

12. The charging station of claim 8, wherein the first pocket and the second pocket have a circular cross-section.

13. The charging station of claim 8, wherein a first pocket opening and a second pocket opening are elevated above a lower surface of the horizontally oriented housing.

14. The charging station of claim 8, further comprising a charging circuit for controlling the transfer of charging power.

15. The charging station system of claim 8, wherein the yoke has a circular cross-section.

16. A charging station for a wireless headset comprising:

a housing means for presenting a wireless headset in an upright position;

a first pocket means for receiving a first wireless headset yoke;

a second pocket means for receiving a second wireless headset yoke;

a charging station electrical interface means disposed within the first pocket means for mating with an associated wireless headset electrical interface disposed at the first wireless headset yoke.

17. The charging station of claim 16, further comprising a power supply interface means for receiving charging power from a power source.

18. The charging station of claim 16, wherein the first pocket means has a first pocket means opening and the second pocket means has a second pocket means opening which are elevated above a lower surface of the housing means.

19. The charging station of claim 16, wherein the first pocket means and the second pockets means have a circular cross-section.

20. The charging station of claim 16, further comprising a charging circuit means for controlling the transfer of charging power.

21. A charging station for a wireless headset comprising:

a housing;

a first pocket to receive a first wireless headset yoke flexibly coupling a first speaker to a headset headband;

a second pocket to receive a second wireless headset yoke flexibly coupling a second speaker to the headset headband; and a charging station electrical interface disposed within the first pocket, wherein the charging station electrical interface mates with an associated wireless headset electrical interface disposed at the first wireless headset yoke.

22. The charging station of claim 21, wherein the first wireless headset yoke includes a yoke stem oriented in a first position downward when the wireless headset is inserted in the first pocket and a second position oriented upward when the wireless headset is worn.

23. The charging station of claim 21, wherein the charging station electrical interface comprises a male plug with an interior contact and an exterior contact.

24. The charging station of claim 21, wherein the first pocket and the second pocket have a circular cross-section.

* * * * *